United States Patent
Wang et al.

(10) Patent No.: US 11,141,925 B2
(45) Date of Patent: Oct. 12, 2021

(54) ULTRASONIC WELDING AND WELDING HORN HAVING INDENTER

(71) Applicant: GM GLOBAL TECHNOLOGY OPERATIONS LLC, Detroit, MI (US)

(72) Inventors: Pei-chung Wang, Troy, MI (US); Bradley J. Blaski, Sterling Heights, MI (US); Athreya Nagesh, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/669,802

(22) Filed: Oct. 31, 2019

(65) Prior Publication Data

US 2021/0129453 A1    May 6, 2021

(51) Int. Cl.
*B29C 65/08* (2006.01)
*B29C 65/00* (2006.01)

(52) U.S. Cl.
CPC ............ *B29C 65/08* (2013.01); *B29C 66/721* (2013.01); *B29C 66/81429* (2013.01); *B29C 66/81433* (2013.01)

(58) Field of Classification Search
CPC ...... B32B 2310/028; B29C 65/08–088; B29C 65/645; B29C 66/81427; B29C 66/81429; B29C 66/81433; B29C 66/951; B29C 66/9511; B29C 66/9512; B29C 66/9513; B29C 66/9515; B29C 66/9516; B29C 66/9517; B29C 66/721; B29C 65/7443; B29C 65/8292; B29C 66/73151; B29C 66/73152; B29C 66/9231; B23K 20/10; B23K 20/106; B23K 1/06

USPC .......... 156/73.1–73.4, 580.1, 580.2; 228/1.1, 228/110.1
See application file for complete search history.

(56) References Cited

U.S. PATENT DOCUMENTS

| | | | |
|---|---|---|---|
| 6,523,732 B1 | 2/2003 | Popoola et al. | |
| 7,793,815 B2 * | 9/2010 | Shimizu ................. | B29C 66/43 228/1.1 |
| 7,993,537 B2 | 8/2011 | Hector et al. | |
| 8,747,015 B1 | 6/2014 | Polewarczyk et al. | |

(Continued)

OTHER PUBLICATIONS

U.S. Appl. No. 16/580,289, filed Sep. 24, 2019 by GM Global Technology Operations LLC, titled "Apparatus for Ultrasonic Welding of Polymers and Polymeric Composites."

(Continued)

*Primary Examiner* — John L Goff, II (57) ABSTRACT

A method of joining includes disposing a second workpiece adjacent to a first workpiece. The method further includes identifying a determined hardness parameter of at least one of the first and second workpieces at a welding position. The determined hardness parameter is determined by at least one of estimation, calculation, and measurement. The method includes selecting a weld schedule based on the determined hardness parameter and welding the first and second workpieces together using the selected weld schedule. A welding horn includes a shank and a tip having an end face, the tip being disposed at an end of the shank and configured to contact a workpiece and to transmit energy to the workpiece. Knurls are disposed on the end face, each knurl having a distal end. A curved indenter extends from the end face beyond the distal ends of the knurls.

13 Claims, 4 Drawing Sheets

(56) References Cited

U.S. PATENT DOCUMENTS

| | | |
|---|---|---|
| 8,747,606 B2 | 6/2014 | Xie et al. |
| 9,527,236 B2 | 12/2016 | Wang |
| 9,550,323 B2 | 1/2017 | Wang et al. |
| 9,573,320 B2 | 2/2017 | Wang |
| 9,796,134 B2 | 10/2017 | McKay et al. |
| 9,827,707 B2 | 11/2017 | Wang et al. |
| 9,929,122 B2* | 3/2018 | Delsman .............. B23K 20/007 |
| 9,987,796 B2 | 6/2018 | Wang |
| 10,076,871 B2 | 9/2018 | Wang |
| 10,105,788 B2 | 10/2018 | Wang et al. |
| 10,150,178 B2 | 12/2018 | Foss et al. |
| 10,160,161 B2 | 12/2018 | Wang |
| 10,189,075 B2 | 1/2019 | Wang et al. |
| 10,189,206 B2 | 1/2019 | Wang |
| 10,239,150 B2 | 3/2019 | Cooper et al. |
| 10,259,170 B2 | 4/2019 | Wang |
| 10,265,913 B2 | 4/2019 | Rousseau |
| 2009/0065484 A1 | 3/2009 | Wang et al. |
| 2013/0122246 A1 | 5/2013 | Berger et al. |
| 2014/0034213 A1* | 2/2014 | Cham ............... B29C 66/81422 156/73.1 |
| 2014/0219586 A1 | 8/2014 | DeFedericis et al. |
| 2015/0090405 A1* | 4/2015 | Hull ..................... B65B 51/225 156/580.2 |
| 2017/0121083 A1* | 5/2017 | Hishinuma ........... B29C 66/133 |
| 2017/0355150 A1 | 12/2017 | Wang et al. |

OTHER PUBLICATIONS

Lee et al., Analysis of Weld Formation in Multilayer Ultrasonic Metal Welding Using High-Speed Images, Journal of Manufacturing Science and Engineering, Jun. 2016, 031016-1 to 031016-8, vol. 137, The American Society of Mechanical Engineers, New York, NY, USA.

* cited by examiner

ULTRASONIC WELDING AND WELDING HORN HAVING INDENTER

FIELD

The present disclosure generally relates to welding and more specifically to techniques for ultrasonic welding, as well as to a welding horn, which are particularly useful for joining polymeric composite components.

INTRODUCTION

Ultrasonic welding may be used to join polymeric and/or metal components. In ultrasonic welding, the plastic or metal components are clamped between a welding horn and an anvil. To weld using ultrasonic energy, high-frequency vibrations are applied to the components to be joined by a high frequency vibration of the horn. The horn, or sonotrode, is a tool that creates ultrasonic vibrations that are applied to a workpiece or material such as for welding, machining, or mixing. In the case of ultrasonic welding, component joining occurs as the result of applied mechanical force and heat generated at the interface between the components by the mechanical vibration.

Delivering consistent weld quality using ultrasonic welding requires overcoming a number of challenges. Process variables including clamp load, vibration amplitude, and weld time must be set precisely and must take into consideration variations in stack height and material. With the welding of plastic, clamp forces must be kept low enough to avoid distortion of the components, while stiffer materials require higher clamp loads. If the clamp forces are too low or if misalignment occurs, insufficient weld formation may result.

Additional complications are present when attempting to join polymeric composite materials, and weld joints of these materials may become discrepant. Accordingly, polymeric composite materials are typically joined mechanically, such as by staking or riveting, or through adhesives, to avoid the issue with weld joints breaking apart, but these methods may add time and expense.

SUMMARY

The inventors hereof have discovered that a main reason for weld failure in welded polymeric composite materials is that the material itself varies in hardness or local material properties across a single workpiece. Accordingly, applying the same weld schedule to all of the welding locations in the workpiece stack-up is highly likely to create both good welds and welds that become discrepant, due to the use of a weld schedule that is only tuned for the hardness or local material properties of a portion of the workpiece. Accordingly, a method is provided herein that includes varying the weld schedule based on the hardness, or on a hardness parameter, at each of the individual weld locations. The hardness or hardness parameter may be determined at each of the individual weld locations, for example, through correlation of a depth of displacement of an indenter or through correlation of power applied through an initial force. A welding horn that includes an indenter is also provided.

In one form, which may be combined with or separate from the other forms or examples provided herein, the present disclosure provides a method of joining. The method includes providing a first workpiece and disposing a second workpiece adjacent to the first workpiece. The method includes identifying a determined hardness parameter of the second and/or of the first workpiece at a welding position, where the determined hardness parameter is determined by estimation, calculation, and/or measurement. The method also includes selecting a weld schedule based on the determined hardness parameter to identify a selected weld schedule and welding the first and second workpieces together using the selected weld schedule.

In another form, which may be combined with or separate from the other forms or examples provided herein, a welding horn for ultrasonic welding a plurality of workpieces together is provided. The welding horn includes a shank and a tip having an end face. The tip is disposed at an end of the shank and configured to contact a first workpiece and to transmit energy to the first workpiece. A plurality of knurls is disposed on the end face, each knurl having a distal end. A curved indenter extends from the end face beyond the distal ends of the knurls.

Additional details may optionally be provided, including but not limited to the following: wherein the first and second workpieces are each formed of a polymeric composite material; wherein the polymeric composite material comprises a thermoplastic polymer matrix and a plurality of reinforcing chopped fibers disposed within the thermoplastic polymer matrix; wherein the polymeric composite material is a carbon-reinforced nylon having a plurality of chopped carbon fibers disposed within the nylon; the plurality of chopped carbon fibers having an average fiber length no greater than 50 millimeters and an average diameter no greater than one micrometer; wherein the step of welding includes ultrasonically welding the first and second workpieces together; wherein the step of identifying the determined hardness parameter includes pressing an indenter into a surface of the first workpiece with a predetermined force and determining a depth of a displacement of the indenter after pressing the indenter into the surface of the first workpiece; providing the indenter on a face of a welding horn; the step of welding including applying the selected weld schedule through a tool set comprising the welding horn and a mating anvil; providing the welding horn having a plurality of knurls disposed on the face of the welding horn; the face being curved and defining a tip radius of curvature; the indenter defining an indenter radius of curvature; the tip radius of curvature being greater than the indenter radius of curvature; the shank defining an end shank radius at the end of the shank; the tip radius of curvature being at least four times the end shank radius; the shank defining an end shank diameter at the end of the shank; the indenter radius of curvature being less than the end shank diameter; the end shank diameter being no greater than four times the indenter radius of curvature; the indenter extending no more than 2.0 mm beyond the distal ends of the knurls in a direction normal to the end face; the plurality of knurls defining a knurl pitch between adjacent knurls; each knurl being defined by a knurl angle extending from a knurl base to an outwardly extending knurl edge; the knurl angle being in range of 40 to 60 degrees; and a ratio of the knurl pitch to the end shank diameter being at least 0.045 and no greater than 0.065.

The selected weld schedule may include one or more of the following: a predetermined horn amplitude, a predetermining total welding time, an initial horn trigger force, a total distance of displacement of the welding horn into the first workpiece, a total amount of energy applied to the first workpiece through the welding horn, a velocity of moving the welding horn into the first workpiece, a maximum amount of force applied to the first workpiece by the welding horn, and an amount of melted material of the first workpiece after an initial application of energy from the welding horn prior to moving the welding horn into the first workpiece.

Further additional optional details may be provided, including but not limited to the following: wherein the step of identifying the determined hardness parameter includes pressing a tool into a surface of one of the first and second workpieces with a predetermined force and a predetermined amplitude and determining a power applied through the tool upon pressing the tool into the surface with the predetermined force and the predetermined amplitude; wherein the tool is a welding horn of a tool set comprising the welding horn and a mating anvil; and wherein the step of ultrasonically welding includes applying the selected weld schedule through the tool set.

In addition, the method may include identifying a plurality of additional determined hardness parameters of at least one of the first and second workpieces at a plurality of additional welding positions, selecting a weld schedule for each of the plurality of additional welding positions based on the plurality of additional determined hardness parameters to identify a plurality of additional selected weld schedules, each additional selected weld schedule correlating with an additional welding position of the plurality of additional welding positions, and welding the first and second workpieces together at each of the additional welding positions using the plurality of additional selected weld schedules.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The drawings herein are schematic in nature and are not necessarily drawn to scale or representative of the distances or relationships between the elements shown.

DETAILED DESCRIPTION

The following detailed description is merely exemplary in nature and is not intended to limit the application and uses.

Figure 1:
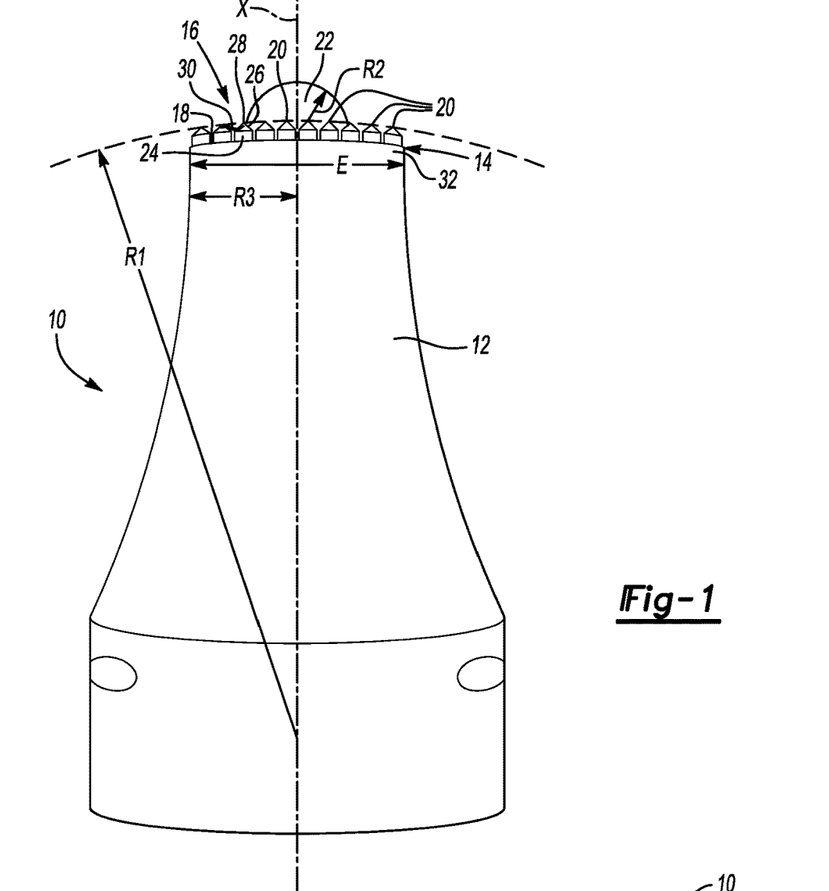
FIG. 1 is a schematic side view of a welding horn having a plurality of knurls and an indenter extending from an end face, in accordance with the principles of the present disclosure.
Figure 2:
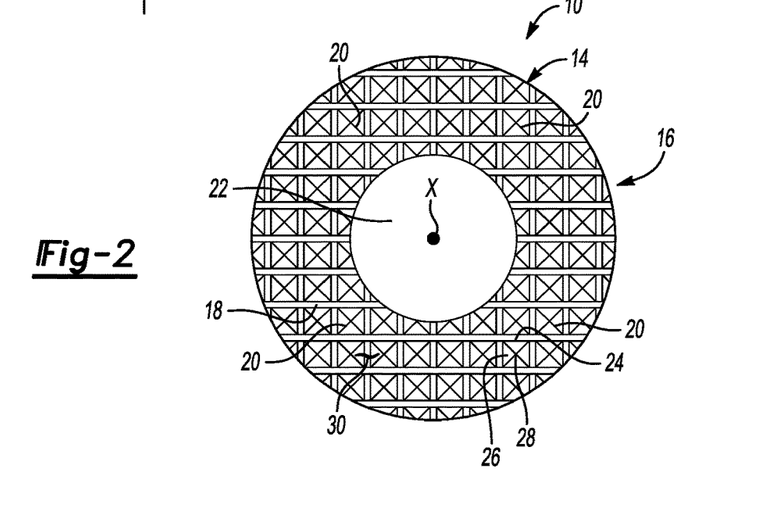
FIG. 2 is a schematic end view of the welding horn of FIG. 1, according to the principles of the present disclosure.

Referring now to FIGS. 1-2, a welding horn, or sonotrode, for use in vibrational or ultrasonic welding, such as conventional ultrasonic welding or ultrasonic torsional welding, to weld a plurality of workpieces together, is illustrated and generally designated at 10. The welding horn 10 includes a shank 12 and a tip 14 disposed at an end 16 of the shank 12. The tip 14 has an end face 18, which may be slightly curved to define a relatively large radius of curvature R1. The tip 14 is configured to contact a workpiece and to transmit energy to the workpiece to perform a welding operation, which will be described in further detail below.

Figure 3:
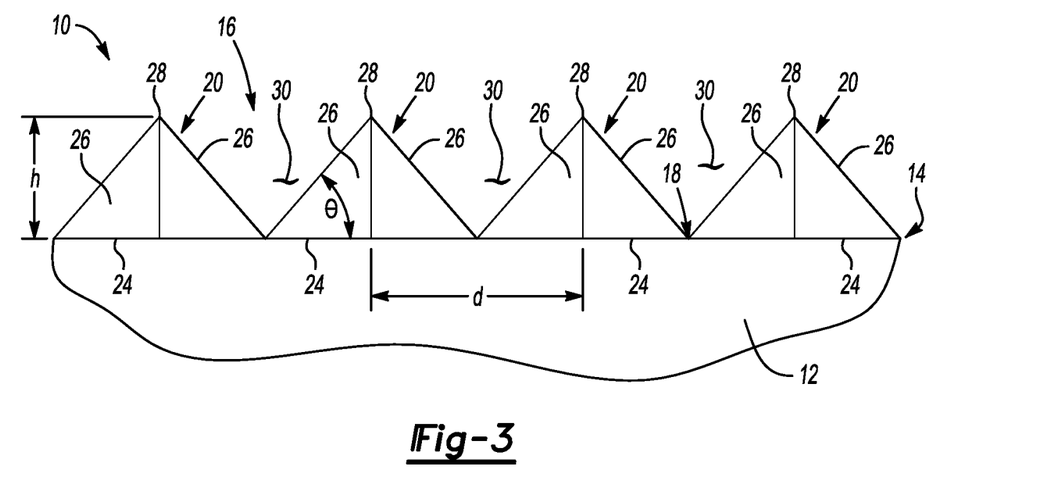
FIG. 3 is a schematic side view of a portion of the plurality of knurls of the welding horn of FIGS. 1 and 2, in accordance with the principles of the present disclosure.

Referring to FIGS. 1-3, a number of knurls 20 may be disposed on the end face 18. The knurls 20 may be disposed adjacent to one another and uniformly distributed on the end face 18 except where interrupted by an indenter 22. In the illustrated example, each knurl 20 is shaped as a diamond pyramid, or four-sided pyramid, having a base 24 and sloping sides 26 that end in a distal end 28 of the knurl 20. Thus, each distal end 28 is a pointed tip of the knurl 20, and the distal ends 28 are separated by grooves 30 between the knurls 20. Though the knurls 20 are illustrated as being arranged in a pattern of straight lines, side by side, the knurls 20 could alternatively be illustrated in other patterns, such as a staggered or annular pattern, by way of example. Further, although the knurls 20 are illustrated as four-sided pyramids, they could be other shapes, such as three-sided pyramids, conical, or another shape.

Except with respect to the indenter 22 being disposed amongst the knurls 20 on the end face 18, the knurls 20 are separated from one another by a uniform knurl pitch d. The knurl pitch d may be defined as the distance from the pointed distal end 28 (or the center) of one knurl 20 to the pointed distal end 28 (or center) of an adjacent knurl 20. Each knurl also defines a knurl angle θ. The knurl angle θ may be defined as the angle between each side 26 of a knurl 20 and the base 24 of the knurl 20, or as the angle between a side 26 of the knurl 20 and a tangent plane P that extends tangentially across the face 18 where the base 24 meets the side 26 of the knurl 20. The knurl pitch d and the knurl angle θ determine the size of each knurl 20, including the height h. The height h may be defined as the distance from the base 24 to a distal end 28 of a knurl 20 along a line normal to the base 24 or to a plane that extends tangentially along the base 24 of the knurl 20 at a point directly under the distal end 28, so that such plane runs perpendicular to a central axis X of the welding horn 10.

A variety of knurl pitches d, knurl angles θ, and tip radii R1 may be desirable, depending on the application. For example only, the knurl pitch d may be provided in the range of 0.75 to 1.25 millimeters, the knurl angle θ may be provided in the range of 30 to 60 degrees, or 40 to 60 degrees, and the tip radius R1 may be provided in the range of 32 to 41 millimeters.

The indenter 22 is curved and extends from the end face 18 of the tip 14 beyond the distal ends 28 of the knurls 20. The indenter 22 may be located centrally on the face 18, symmetric about the central axis X of the welding horn 10, but it could also be located on another part of the face 18, or the indenter may be provided on a separate tool. In some examples, the indenter 22 may be shaped as a portion of a sphere and may define a radius of curvature R2. The tip radius of curvature R1 is greater than the indenter radius of curvature R2, as can be seen in FIG. 1. The shank 12 defines an end shank radius R3 and an end shank diameter E at the end 32 of the shank 12 that connects to the tip 14. The tip radius of curvature R1 is preferably at least four times the end shank radius R3. The indenter radius of curvature R2 is less than the end shank diameter E. In some examples, the end shank diameter E is no greater than four times the indenter radius of curvature R2. In one preferred example, the relationship between the end shank diameter E and the indenter radius of curvature R2 may be defined as follows:

$$0.78*E \geq R2 \geq 0.29*E \quad (1)$$

In some examples, the indenter radius of curvature R2 may be approximately half of the shank radius R3, or the indenter radius of curvature R2 may be in the range of ¼ to ¾ of the shank radius R3. In a preferred example for use with the workpiece materials described herein, the indenter 22 extends no more than 2.0 mm beyond the distal ends 28 of the knurls 20 in a direction normal to the end face 18 or to a plane tangential to the end face 18 at the central axis X of the horn 10. In some examples, a ratio of the knurl pitch d to the end shank diameter E is at least 0.045 and no greater than 0.065.

Figures 4A, 4B:
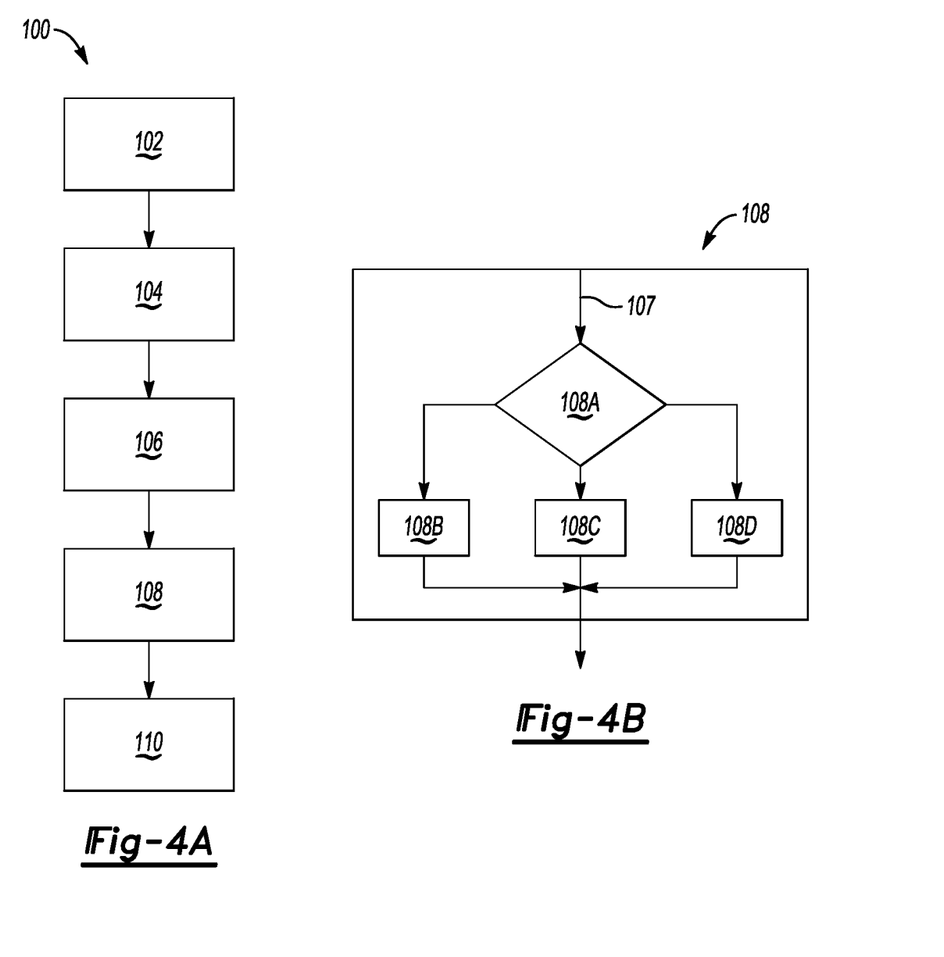
FIG. 4A is a block diagram schematically illustrating a method of joining, according to the principles of the present disclosure.
FIG. 4B is a block diagram schematically illustrating additional detail of a step of the method of FIG. 4A, according to the principles of the present disclosure.
Figure 5A:
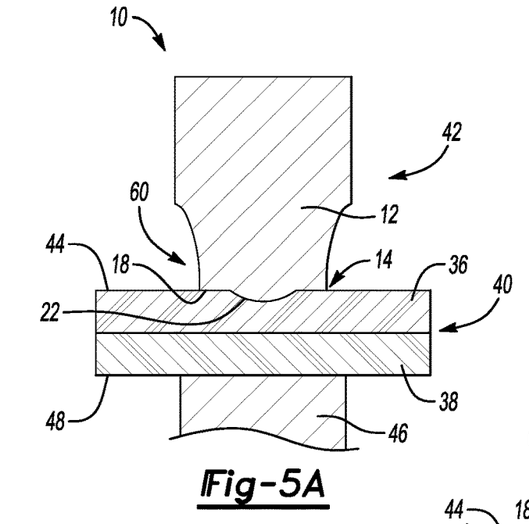
FIG. 5A is a schematic cross-sectional view of a welding assembly including the welding horn of FIGS. 1-3 in contact with a workpiece stack-up and having a corresponding anvil disposed adjacent to the workpiece stack-up so that the workpiece stack-up is sandwiched between the horn and the anvil, the horn contacting the workpiece stack-up without applying heat to perform a step of the method of FIG. 4, in accordance with the principles of the present disclosure.

Referring now to FIG. 4, a method of joining is illustrated in a block diagram and generally designated at 100. Referring to FIG. 5A, and with continued reference to FIG. 4, the method 100 includes a step 102 of providing a first workpiece 36 and a step 104 of disposing a second workpiece 38 adjacent to the first workpiece 36 so that the first and second workpieces 36, 38 form a workpiece stack-up 40. A welding assembly 42 includes the welding horn 10 disposed on an outer side 44 of the first workpiece 36 and a corresponding anvil 46 disposed on an outer side 48 of the second workpiece 38.

The first and second workpieces 36, 38 may each be formed of the same or different polymeric composite materials. For example, the polymeric composite material may comprise a thermoplastic polymer matrix and a plurality of reinforcing chopped fibers disposed within the thermoplastic polymer matrix. In one form, the polymeric composite material is a carbon-reinforced nylon, such as nylon 6, having a plurality of chopped carbon fibers disposed within the nylon. The plurality of chopped carbon fibers may be short fibers and may have an average fiber length no greater than 50 millimeters and an average diameter no greater than one micrometer.

Other examples of the thermoplastic used in the material include: polyamide resin, polystyrene resin, acrylonitrile styrene resin, acrylonitrile-butadiene-styrene resin, polyvinyl alcohol resin, vinyl chloride resin, vinylidene chloride resin, vinyl acetate resin, acrylic resin, polyacrylate resin, methacrylate resin, polypropylene resin, polyethylene resin, polycarbonate resin, polyacetal resin, polylactide resin, polyethylene terephthalate resin, polyethylene naphthalate resin, polybutylene terephthalate resin, polyphenylene ether resin, polyphenylene sulfide resin, polysulfone resin, polyether sulfone resin, polyether ether ketone resin, copolymers, and combinations thereof. Some examples, without limitation, of reinforcement materials include: carbon fibers, glass fibers, carbon black particles, and combinations thereof.

Figure 5B:
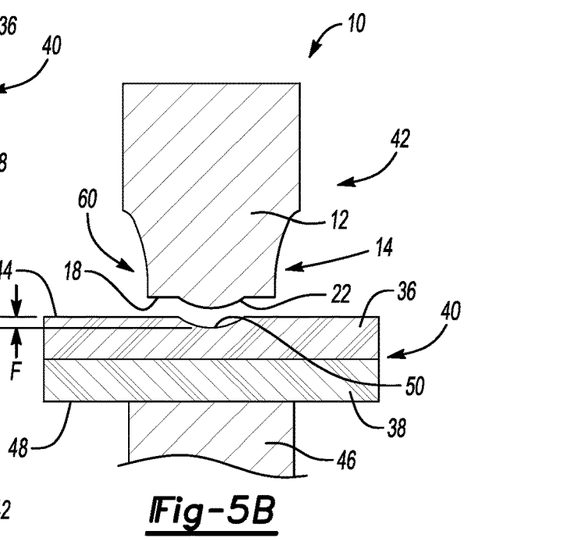
FIG. 5B is a schematic cross-sectional view of the welding assembly of FIG. 5A, with the welding horn removed from contact with the workpiece stack-up after contacting the workpiece stack-up as shown in FIG. 5A, according to the principles of the present disclosure.

As shown in FIG. 5A, the welding horn 10 is initially pressed against the outer side 44 of the first workpiece 36 with an initial force, preferably without applying energy or heat, to press the indenter 22 into the first workpiece 36. Pressing the indenter 22 against the outer side 44 of the first workpiece 36 creates an indented portion 50 in the outer side 44 of the first workpiece 36, as can be seen in FIG. 5B after the welding horn 10 has been moved away from and out of contact with the first workpiece 36.

The method 100 includes a step 106 of identifying a determined hardness parameter of at least one of the first and second workpieces at a welding position 60. As used herein, the hardness parameter is indicative of local hardness or other local material properties at a given location. The determined hardness parameter may be determined by estimation, calculation, and/or measurement. In the illustrated example, the determined hardness parameter of the first workpiece 36 includes the depth F of the indented portion 50. The depth F varies based on the hardness of the first workpiece 36 at the welding location. For workpieces formed of a composite thermoplastic fiber material, hardness may vary along the outer side 44 of the workpiece 36 because fibers are disposed in random different ways throughout a thermoplastic matrix of the material. Upon application of a predetermined force by the horn 10 to press the indenter 22 into the first workpiece, the depth F of the indented portion 50 may be correlated to a set of predetermined hardness values or ranges, such as in a look-up table or a calibrated program. Thus, the depth F may be the determined hardness parameter, which may be used to determine a hardness at the welding location 60, or the depth F may be input into a program and used directly to select a welding schedule, which will be described in further detail below.

Instead of using the welding horn 10, the indented portion 50 may alternatively be formed by a separate indenter tool to determine a displacement at each welding location, without falling beyond the spirit and scope of the present disclosure.

In still another example, the step 106 of identifying the determined hardness parameter may include pressing a tool, such as horn 10 or a horn having no indenter, into the outer surface 44 with a predetermined force and a predetermined amplitude. A power applied through the tool upon pressing the tool into the surface 44 with the predetermined force and the predetermined amplitude may be determined and identified as the determined hardness parameter. The amount of applied power when a predetermined force and amplitude are applied will vary based on the local hardness of the material. That applied power may be correlated to a predetermined set of hardness values, if desired, to ultimately select a schedule, or the applied power itself may be used to select the welding schedule without the intermediate step of correlating the power to a hardness value.

The method 100 then includes a step 108 of selecting a weld schedule based on the determined hardness parameter. Weld schedules may have various parameters. For example, a weld schedules may include one or more of the following parameters: a predetermined initial horn amplitude; a pre-determining total welding time; an initial horn trigger force; a total distance of displacement of the welding horn into the workpiece; a total amount of energy applied to the workpiece through the welding horn; a velocity of moving the welding horn into the workpiece; a maximum amount of force applied to the workpiece by the welding horn; an amount of melted material of the workpiece after an initial application of energy from the welding horn prior to moving the welding horn into the workpiece; and/or any other desired parameter. Thus, a welding controller (not shown) may be calibrated to select a predetermined weld schedule based on the determined hardness parameter, and the parameters of the weld schedule may differ depending on the selected weld schedule, which is selected based on the determined hardness parameter. Thus, for a first welding location on the workpiece 36 having a first determined hardness parameter, a first weld schedule may be selected, and for a second welding location on the same workpiece 36 having a second determined hardness parameter, where the second determined hardness parameter is different from the first determined hardness parameter, a second weld schedule may be selected. In that case, because of the different hardness parameters, the first and second schedules may be different from one another, having different weld schedule parameter values.

Referring to FIG. 4B, the step 108 of selecting the weld schedule is illustrated in additional detail. The determined hardness parameter is provided via step 106, and then the step 108 may include a substep 108A whereby the method 100 includes determining a range in which the determined hardness parameter lies. In the illustrated example, if there are three predetermined hardness parameter ranges that may be chosen, the step 108A determines whether the determined hardness parameter 107 is in a first range, a second range, or a third range. If the determined hardness parameter is in the first range, the method 100 proceeds to substep 108B to select a first predetermined weld schedule; if the determined hardness parameter is in the second range, the method 100 proceeds to substep 108C to select a second predetermined weld schedule; and if the determined hardness parameter is in the third range, the method 100 proceeds to substep 108D to select a third predetermined weld schedule. Although three ranges and weld schedules are described here, any number of desired ranges and corresponding weld schedules may be used, without falling beyond the spirit and scope of the present disclosure.

Figure 5C:
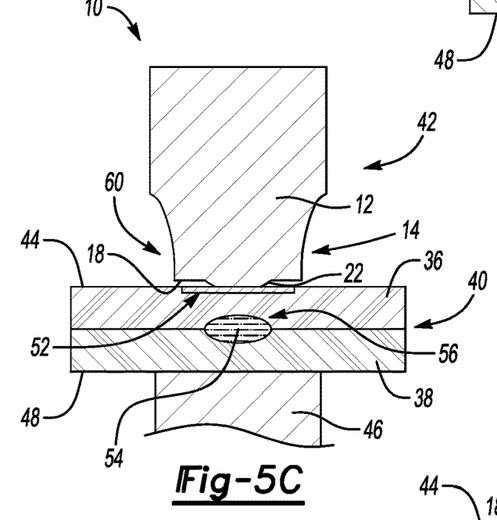
FIG. 5C is a schematic cross-sectional view of the welding assembly of FIGS. 5A-5B, with the welding horn contacting and applying an initial force and horn amplitude to the workpiece stack-up, according to the principles of the present disclosure.

The selected weld schedule, selected in step 108, is then provided to a step 110. In step 110, the method 100 then includes welding the first and second workpieces 36, 38 together using the selected weld schedule. Referring to FIG. 5C, the welding step 110 may include first applying an initial weld amplitude via the horn 10 using an initial trigger force. Thus, in step 5C, an initial energy is applied to the outer side 44 of the first workpiece 36 through horn 10. This causes some of the first workpiece 36 to melt or soften at the interface 52 between the horn 10 and the outer side 44, and an initial melt 54 starts to form at a faying interface 56 between the first and second workpieces 36, 38. After the initial welding amplitude and trigger force are applied, the welding horn 10 may then be moved away from the outer side 44 of the first workpiece 36, if desired.

Figure 5D:
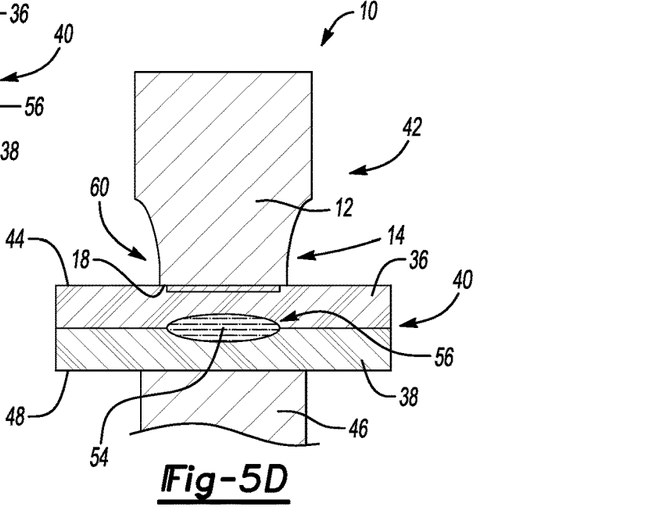
FIG. 5D is a schematic cross-sectional view of the welding assembly of FIGS. 5A-5C, with the welding horn contacting and applying additional horn amplitude to the workpiece stack-up after applying the initial force and induced heat to the workpiece stack-up as shown in FIG. 5C, according to the principles of the present disclosure.

Referring now to FIG. 5D, the welding horn 10 is then moved back into contact with the first workpiece 36 (if moved away) and the rest of the weld schedule is applied to complete the forming of the weld nugget 54 at the faying interface 56. The welding step 110 includes applying the selected weld schedule, for example, through the tool set that includes the welding horn 10 and the mating anvil 46 to weld the workpieces 36, 38 together and form a welded assembly. Although two workpieces 36, 38 are illustrated in the stack-up 40, additional workpieces may be included, if desired.

The welding assembly 42 may be an ultrasonic type configured to perform the welding step 110 using ultrasonic welding. The workpiece stack-up 40 is clamped between the horn 10 and the anvil 46. The horn 10 may be electrically connected to a converter/booster (not shown), which converts an electrical signal into a mechanical vibration and produces the amplitude of the welding horn 10. The horn 10 applies the vibration to the components 36, 38. The vibration frequency is generally in the range of 20-40 kilohertz. The motion of the vibration at the horn face 18 is transferred to the two components 36, 38. The vibration moves through the first workpiece 36 and creates friction and visco-elastic deformation at the faying interface 56 between the first and second workpieces 36, 38. As a result, heat is created at the faying interface 56 that melts the material, which is then cooled to form a weld joint fusing the components 36, 38 together.

Figure 6:
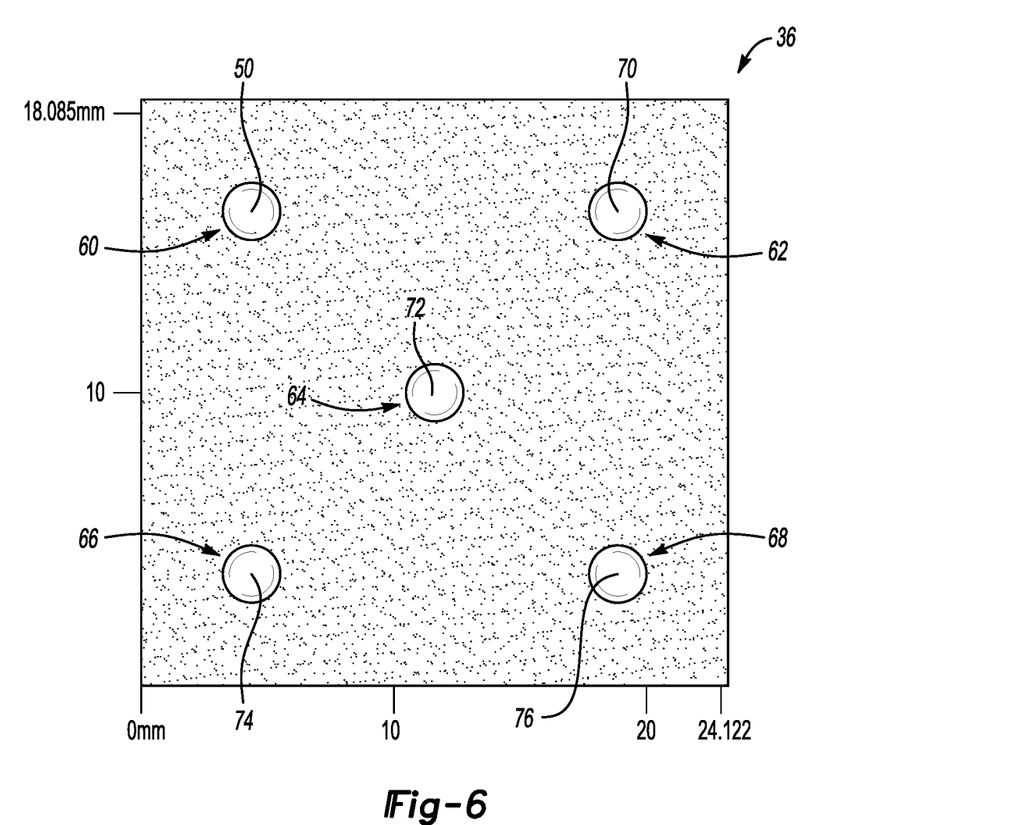
FIG. 6 is a perspective view of a workpiece having indented portions formed by an indenter, such as the indenter of the welding horn shown in FIGS. 1-3 and 5A-5D, in accordance with the principles of the present disclosure.

Referring now to FIG. 6, a portion of the first workpiece 36 is illustrated. The method 100 described above is performed at the welding position 60 on the first workpiece 36. The determined hardness parameter at the first welding position 60 is a first determined hardness parameter, and the selected weld schedule is a first selected weld schedule. However, many parts that need to be joined are large and may need many weld joints to adequately join them together. Thus, the method 100 may further include identifying a plurality of additional determined hardness parameters of at least one of the first and second workpieces (in this case, of the first workpiece 36) at a plurality of additional welding positions 62, 64, 66, 68. At each additional welding position 62, 64, 66, 68, a weld schedule may be selected based on the determined hardness parameters at each of the welding positions 62, 64, 66, 68. The first and second workpieces 36, 38 are then welded together at each of the additional welding positions 62, 64, 66, 68 using the plurality of additional selected weld schedules.

The hardness parameter at each of the welding positions 62, 64, 66, 68 may be determined in any suitable way, such as those described above. For example, an indenter, such as the indenter 22, may be used to form an indented portion 70, 72, 74, 76 at each of the welding positions 62, 64, 66, 68, respectively. The depth of each indented portion 70, 72, 74, 76, which correlates to a predetermined hardness parameter, may then become the basis on which a weld schedule is selected for each welding position 62, 64, 66, 68.

In some examples, the steps of the method are performed by a controller, and the hardness itself may never be separately identified, such that the controller advances to selecting the weld schedule after it has the depth measurement, calculation, or estimation, because the intermediate step of determining the hardness value and then selecting the weld schedule may need not be shown to a user. Thus, the determined hardness parameter may be any determined value that correlates to hardness, such as depth of the indented portion or applied power based on a predetermined amplitude and force. Thus, the controller would then use the depth or other identifying information (e.g., applied power) as the determined hardness parameter as the basis on which it selects a predetermined weld schedule based on a calibration or program in the controller. Any number of interim calculations or estimations may be performed to arrive at the selected weld schedule based on the determined hardness parameter. Furthermore, multiple determined hardness parameters may be used together to select the weld schedule; for example, the weld schedule may be selected based on both the applied power and the depth of the indented portion. It should be understood that, due to variances in the composite thermoplastic materials, the determined hardness parameters at each of welding positions 60, 62, 64, 66, 68 are likely to vary from one another.

Weld quality overall is improved by the method disclosed herein because the appropriate weld schedule based on local material hardness is applied, based on the determined hardness parameter that is calculated, estimated, or measured at the local welding location, and the weld schedule may be adjusted for each weld being made so that every weld has the most effective weld schedule for the hardness of the local area upon which the welding operation is performed. Therefore, a weld schedule that will result in a well-fused joint is selected based on the determined hardness parameter, which correlates to the hardness of the material at the local welding location.

The method 100 described herein may be performed by a controller or a set of controllers, by way of example. The controller(s) may be part of, or include, an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The controller(s) may include memory (shared, dedicated, or group) that stores code executed by the processor. The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Thus, the apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A method of joining, the method comprising:
providing a first workpiece;
providing a welding horn comprising:
a shank defining an end shank radius at an end of the shank;
a tip having an end face, the tip being disposed at an end of the shank and configured to contact the first workpiece and to transmit energy to the first workpiece, the end face being curved and defining a tip radius of curvature;
a plurality of knurls disposed on the end face, each knurl having a distal end; and
a curved indenter extending from the end face beyond the distal ends of the knurls, the curved indenter defining an indenter radius of curvature, the tip radius of curvature being greater than the indenter radius of curvature and the tip radius of curvature being at least four times the end shank radius
disposing a second workpiece adjacent to the first workpiece;
identifying a determined hardness parameter of at least one of the first and second workpieces at a welding position, the determined hardness parameter being determined by at least one of estimation, calculation, and measurement;
selecting a weld schedule based on the determined hardness parameter; and
ultrasonically welding, using the welding horn, the first and second workpieces together using the selected weld schedule.

2. The method of claim 1, wherein the first and second workpieces are each formed of a polymeric composite material.

3. The method of claim 2, wherein the polymeric composite material comprises a thermoplastic polymer matrix and a plurality of reinforcing chopped fibers disposed within the thermoplastic polymer matrix.

4. The method of claim 3, wherein the polymeric composite material is a carbon-reinforced nylon having a plurality of chopped carbon fibers disposed within the nylon, the plurality of chopped carbon fibers having an average fiber length no greater than 50 millimeters and an average diameter no greater than one micrometer.

5. The method of claim 1, wherein the step of identifying the determined hardness parameter includes pressing the curved indenter into a surface of the first workpiece with a predetermined force and determining a depth of a displacement of the curved indenter after pressing the curved indenter into the surface of the first workpiece.

6. The method of claim 5, wherein the selected weld schedule includes a predetermined horn amplitude.

7. The method of claim 6, the selected weld schedule further including at least one of the following: a predetermined total welding time, an initial horn trigger force, a total distance of displacement of the welding horn into the first workpiece, a total amount of energy applied to the first workpiece through the welding horn, a velocity of moving the welding horn into the first workpiece, a maximum amount of force applied to the first workpiece by the welding horn, and an amount of melted material of the first workpiece after an initial application of energy from the welding horn prior to moving the welding horn into the first workpiece.

8. The method of claim 2, wherein the step of identifying the determined hardness parameter includes pressing a tool into a surface of one of the first and second workpieces with a predetermined force and a predetermined amplitude and determining a power applied through the tool upon pressing the tool into the surface with the predetermined force and the predetermined amplitude.

9. The method of claim 1, the welding position being a first welding position, the determined hardness parameter being a first determined hardness parameter, and the selected weld schedule being a first selected weld schedule, the method further comprising identifying a plurality of additional determined hardness parameters of at least one of the first and second workpieces at a plurality of additional welding positions, selecting a weld schedule for each of the plurality of additional welding positions based on the plurality of additional determined hardness parameters to identify a plurality of additional selected weld schedules, each additional selected weld schedule correlating with an additional welding position of the plurality of additional welding positions, and welding the first and second workpieces together at each of the additional welding positions using the plurality of additional selected weld schedules.

10. A welding horn for ultrasonic welding a plurality of workpieces together, the welding horn comprising:
a shank defining an end shank radius at an end of the shank;
a tip having an end face, the tip being disposed at an end of the shank and configured to contact a first workpiece of the plurality of workpieces and to transmit energy to the first workpiece, the end face being curved and defining a tip radius of curvature;
a plurality of knurls disposed on the end face, each knurl having a distal end; and
a curved indenter extending from the end face beyond the distal ends of the knurls, the curved indenter defining an indenter radius of curvature, the tip radius of curvature being greater than the indenter radius of curvature and the tip radius of curvature being at least four times the end shank radius.

11. The welding horn of claim 10, the shank defining an end shank diameter at the end of the shank, the indenter radius of curvature being less than the end shank diameter.

12. A welding horn for ultrasonic welding a plurality of workpieces together, the welding horn comprising:
a shank defining an end shank radius at an end of the shank and an end shank diameter at the end of the shank;
a tip having an end face, the tip being disposed at the end of the shank and configured to contact a first workpiece of the plurality of workpieces and to transmit energy to the first workpiece, the end face being curved and defining a tip radius of curvature;
a plurality of knurls disposed on the end face, each knurl having a distal end; and
a curved indenter extending from the end face beyond the distal ends of the knurls, the curved indenter defining an indenter radius of curvature, the tip radius of curvature being greater than the indenter radius of curvature and the tip radius of curvature being at least four times the end shank radius, the indenter radius of curvature being less than the end shank diameter, the end shank diameter being no greater than four times the indenter radius of curvature, and the indenter extending no more than 2.0 mm beyond the distal ends of the knurls.

13. The welding horn of claim 12, the plurality of knurls defining a knurl pitch between each adjacent knurl that is not interrupted by the indenter, each knurl being defined by a knurl angle extending from a knurl base to an outwardly extending knurl edge, the knurl angle being in range of 40 to 60 degrees, and a ratio of the knurl pitch to the end shank diameter being at least 0.045 and no greater than 0.065.

\* \* \* \* \*